Patented Dec. 8, 1953

2,662,096

UNITED STATES PATENT OFFICE 2,662,096

BIS-(SUBSTITUTED PHENYL)-THIOUREAS

Charles F. Huebner, Morristown, Renat H. Mizzoni, Chester, Robert P. Mull, East Orange, and Caesar R. Scholz, Summit, N. J., assignors to Ciba Pharmaceutical Products, Incorporated, Summit, N. J., a corporation of New Jersey No Drawing. Application July 20, 1951,
Serial No. 237,828

6 Claims. (Cl. 260—552)

The present invention relates to bis-(substituted phenyl)-thioureas and, more particularly, to certain hereinafter-identified 1,3-bis-(p-alkylmercaptophenyl) - 2 - thioureas, 1,3-bis - (p-substituted alkoxyphenyl)-2-thioureas, and 1-(p - alkoxyphenyl) - 3 - p - substituted alkoxyphenyl)-2-thioureas.

Despite intensive research for a long time by scientists for chemotherapeutic agents effective against tuberculosis, the results achieved leave much to be desired. A primary object of the present invention is the embodiment of a group of new substances characterized by antitubercular activity and comprising compounds which, in comparison with known antitubercular compounds, are considerably less toxic while at the same time being of enhanced activity. The butylmercapto derivatives are particularly active.

This object, and others which will hereinafter appear, is realized by the bis-(p-substituted phenyl)-thioureas of the present invention, which thioureas correspond to the formula:

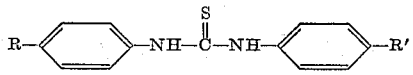

wherein R stands for alkoxy, alkylmercapto, hydroxyalkoxy, alkoxyalkoxy or alkylmercaptoalkoxy, and R' stands for alkylmercapto, hydroxyalkoxy, alkoxyalkoxy and alkylmercaptoalkoxy, the sum of the carbon, oxygen and/or sulfur atoms in each of R and R' being 3 or more but less than 7, and the aggregate number of carbon, oxygen and/or sulfur atoms in R and R' being more than 4 but not more than 14. The carbon chains of the radicals R and R' are fully saturated and are intended to include those wherein the carbon chain is straight or branched. The linkage to the sulfur or oxygen, in the R and R' moieties of compounds of the invention, may be primary or secondary. These compounds are characterized by marked antitubercular activity and by concomitant low toxicity. They may be administered, for example, orally.

The new compounds, as precedingly defined, are obtained by reacting an appropriately p-substituted aniline with an appropriately p-substituted phenyl isothiocyanate according to the reaction:

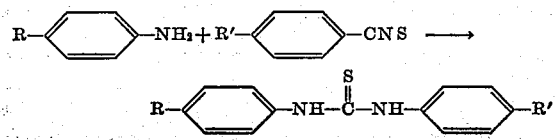

wherein R and R' have the previously-indicated significances. According to this method, R and R' may be identical or different.

The substituted phenylamines used as starting materials in the preparation of the compounds of the present invention may be prepared as follows:

An alkyl halide in slight molar excess (about 10%) is refluxed with the sodium or potassium salt of p-nitrophenol in 75% alcohol for about 10 hours. Most of the alcohol is distilled off and the crude nitro-ether is washed with aqueous alkali to remove unreacted p-nitrophenol. After distillation in vacuo of the nitro-ether or recrystallization thereof, reduction is most conveniently carried out catalytically over Raney nickel in alcohol. The filtered alcohol solution of the substituted phenylamine is then ready for use directly in carrying out the aforesaid reaction.

Alternatively, p-acetaminophenol or p-acetaminothiophenol is converted to its potassium or sodium salt by stirring for a few minutes with one molar equivalent of the alkali in absolute methanol or ethanol. The alkyl halide (10% excess) is added and the mixture refluxed for 6 hours. Most of the alcohol is distilled off and the crystalline acetamino-ether precipitated with water. It is filtered, washed with dilute aqueous alkali and water. It is then hydrolyzed by refluxing with 1 or 2 molar equivalents of 20% sulfuric acid until the solution clears (about 30 minutes). An excess of alkali causes the substituted phenylamine to separate, whereafter it is purified by distillation in vacuo.

A p-alkoxyphenyl amine wherein the carbon chain of the alkyl group is interrupted by a sulfur atom is obtained for example by reacting an acylated halogen-alkoxyphenyl amine—as, for instance, acetyl-β-bromoethoxyaniline—with a mercaptide—as, for instance, sodium ethyl mercaptide—followed by hydrolysis of the protective acyl group.

An alternative method of preparing the compounds of the present invention, in those cases where the para substituents are identical, is by reacting the appropriate substituted aniline with carbon disulfide or with thiophosgene. When carbon disulfide is employed, the reaction is carried out in a solvent such as alcohol, dioxane and the like, and may be hastened by employing a third substance such as hydrogen peroxide or a catalytic amount of sulfur, potassium ethyl xanthate or potassium hydroxide. When thiophosgene is employed, there is added to the mixture an alkaline substance such as an alkali metal hydroxide or carbonate to react with the hydrochloric acid which is liberated.

The new compounds are useful as therapeutics or as intermediates for the preparation of therapeutically active substances. They comprise compounds with antitubercular activity which, in comparison with known antituberculars such as the thiosemicarbazones, are considerably less toxic and of enhanced activity.

The invention is described in greater detail in the examples which follow and which are presented solely by way of illustration and not at all by way of limitation. In the said examples, parts by weight bear the same relation to parts by volume as do grams to milliliters. Temperatures are expressed in degrees centigrade.

*Example 1*

100 parts by weight of p-(2-ethoxyethoxy)-aniline are refluxed for 6 hours with 33 parts by volume of carbon disulfide in 300 parts by volume of ethanol and 5 parts by weight of potassium ethyl xanthate. The reaction mixture is then cooled and the formed 1,3-bis-[p-(2-ethoxyethoxy)-phenyl]-2-thiourea:

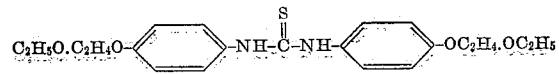

is filtered off, washed with a small amount of ethanol and water, and recrystallized from ethanol. The thus-obtained product melts at 136.5–137.5°.

By replacing the p-(2-ethoxyethoxy)-aniline by an equivalent quantity of p-(2-hydroxyethoxy)-aniline, and otherwise proceeding as described in the preceding paragraph, the corresponding 1,3 - bis - [p - (2 - hydroxy - ethoxy)-phenyl]-2-thiourea:

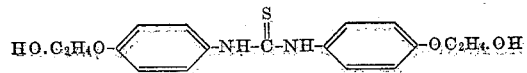

which melts at 185–188°, is obtained.

*Example 2*

100 parts by weight of p-(β-ethylmercaptoethoxy)-aniline are refluxed for 6 hours with 26 parts by volume of carbon disulfide in 300 parts by volume of ethanol and 10 parts by weight of potassium ethyl xanthate. The reaction mixture is then cooled and the formed 1,3-bis-[p-(β-ethylmercaptoethoxy)-phenyl]-2-thiourea:

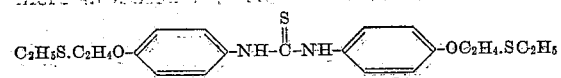

is filtered off, washed with a small amount of ethanol and water, and recrystallized from ethanol. The thus-obtained product melts at 130°.

In each of the preceding Examples 1 and 2 the product may also be recrystallized from acetic acid, chloroform, acetone or methyl ethyl ketone. Moreover, the potassium ethyl xanthate may be replaced by a corresponding quantity of sulfur or powdered potassium hydroxide.

*Example 3*

10 parts by weight of p-(2-ethoxyethoxy)-aniline in 20 parts by volume of ethanol are added with stirring to 10 parts by weight of p-phenetyl isothiocyanate in 20 parts by volume of hot ethanol and the mixture refluxed for fifteen minutes. On cooling, the formed 1-(p-phenetyl)-3-[p-(2-ethoxyethoxy)-phenyl]-2-thiourea:

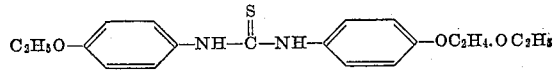

separates out. After recrystallization from ethanol, the melting point is 144–146°.

By replacing the p-(2-ethoxyethoxy)-aniline by the equivalent quantity of p-(2-hydroxyethoxy)-aniline, and otherwise proceeding as set forth in the preceding paragraph, the corresponding 1 - (p - phenetyl) - 3 - [p - (2 - hydroxyethoxy)-phenyl]-2-thiourea:

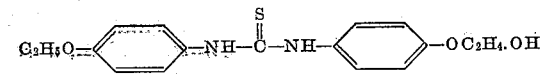

which melts at 173–174°, is obtained.

*Example 4*

100 parts by weight of acetyl-β-bromo-phenetidide are refluxed for three hours in a solution of 24.2 parts by weight of ethyl mercaptan in 132 parts by volume of 2.95 N sodium methoxide in methanol diluted to 500 parts by volume with methanol. Most of the methanol is then distilled off, and the residue caused to crystallize out by dilution with water. The resulting thio-ether is recrystallized from petroleum ether; it melts at 70°.

100 parts by weight of the thus-prepared thioether are refluxed for 1 hour with 500 parts by volume of 4 N aqueous hydrochloric acid. Ammonia is added to make the solution strongly basic and the oily β-ethylmercapto-p-phenetidine is extracted with chloroform. The chloroform solution is dried over sodium sulfate and the solvent removed by distillation.

10 parts by weight of the β-ethylmercapto-p-phenetidine in 50 parts by volume of ethanol are refluxed for 15 minutes with a solution of 9.05 parts by weight of p-phenetyl isothiocyanate in 50 parts by volume of ethanol. On cooling, the formed 1 - (β - ethylmercapto-p-phenetyl) -3- (p-phenetyl)-2-thiourea:

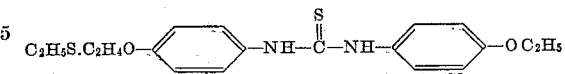

separates out. After recrystallization from acetone-water, it melts at 138–140°.

It will be understood that the p-phenetyl isothiocyanate employed in Examples 3 and 4 may be replaced by other p-alkoxy isothiocyanates, and the p-alkoxyanilines employed in Examples 1 and 2 may be replaced by other p-alkoxyanilines, provided only that the stipulations hereinbefore set forth with regard to the number of carbon and oxygen atoms in R and R' are met. In this way, and by otherwise proceeding according to the said examples, additional (p-substituted phenyl)-thioureas such, for example, as 1-(p-propoxyphenyl)-3-[p-(2-ethoxyethoxy)-phenyl]-2-thiourea, 1 - (p - butoxyphenyl)-3-[p-(2-ethoxyethoxy)-phenyl]-2-thiourea, etc. are obtained.

*Example 5*

100 parts by weight of p-acetaminothiophenol are stirred for five minutes with a solution of 33 parts by weight of commercial sodium methoxide in 500 parts by volume of ethanol. 60 parts by volume of n-propyl bromide are added and the mixture refluxed for four hours. The small amount of sodium bromide separating on cooling is filtered and approximately ¾ of the ethanol distilled off. Water is added to precipitate the crystalline p-acetaminothiophenol propyl ether.

On recrystallization from ethanol-water, the melting point is 75-76°.

70 parts by weight of p-acetaminothiophenol propyl ether are refluxed for 1 hour with a mixture of 35 parts by volume of concentrated hydrochloric acid and 65 parts by volume of ethanol. Most of the solvent is removed by distillation in vacuo, and on cooling p-aminothiophenol propyl ether hydrochloride crystallizes. This material is filtered off and dissolved in 100 parts by volume of water and made alkaline with concentrated sodium hydroxide. The resultant oily free base is extracted with ether, the ether removed and the residue reacted as described below either directly or after distillation in vacuo.

10 parts by weight of p-aminothiophenol propyl ether are refluxed for four hours in 30 parts by volume of ethanol with 7.2 parts by volume of carbon disulfide and one part by weight of potassium ethyl xanthate. On cooling, 1,3-bis-(p-propylmercaptophenyl) - 2 - thiourea crystallizes and is recrystallized from acetone; melting point 160-161°. It has the formula:

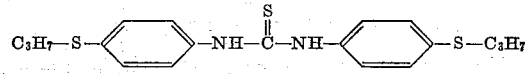

Example 6

6 parts by weight of p-aminothiophenol propyl ether dissolved in 10 parts by volume of ethanol are refluxed for 5 minutes with 6.4 parts by weight of p-phenetyl isothiocyanate in 20 parts by volume of ethanol. On cooling and recrystallization from ethanol the product, 1-(p-phenetyl)-3-(p-propylmercaptophenyl)-2-thiourea, melts at 159-160° and has the formula:

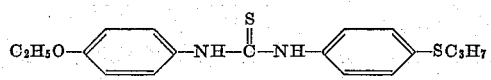

Example 7

Proceeding according to the method described in Example 1, but substituting 75 parts by volume of isopropyl iodide for the 60 parts by volume of n-propyl bromide there called for, p-acetaminothiophenol isopropylether is obtained; melting point 95-97° after recrystallization from ethanol. The acetyl group is hydrolyzed with acid to yield p-aminothiophenol isopropyl ether which is reacted with p-phenetyl isothiocyanate as described in Example 2 to product 1-(p-phenetyl)-3-(p-isopropylmercaptophenyl) - 2 - thiourea, which melts at 148-149° and has the formula:

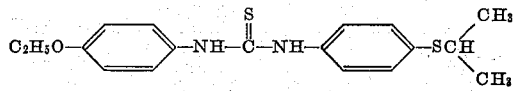

Example 8

Proceeding according to the method of Example 5, but substituting 74 parts by volume of isoamyl bromide as the alkyl halide, hydrolyzing the resulting p-acetaminothiophenol isoamyl ether and reacting 10 parts by weight of the free amine with 6.2 parts by volume of carbon disulfide and 1 part by weight of potassium ethyl xanthate, there is obtained after recrystallization from ethanol 1,3-bis-(p-isoamylmercaptophenyl)-2-thiourea, melting at 140-141° and having the formula:

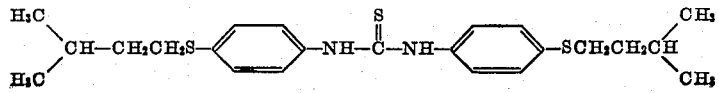

Example 9

10 parts by weight of p-aminothiophenol isoamylether are reacted with 9.2 parts by weight of p-phenetyl isothiocyanate as described in Example 6 to yield 1-(p-isoamylmercaptophenyl) - 3 - (p - phenetyl) - 2 - thiourea; the melting point after recrystallization from ethanol is 151-152°. The compound has the formula:

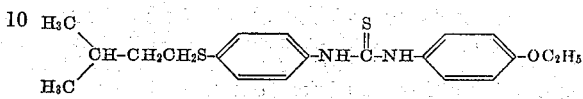

Example 10

10 parts by weight of p-aminothiophenol isoamyl ether are reacted with 11 parts by weight of p-butoxyphenyl isothiocyanate to yield 1-(p-isoamylmercaptophenyl) - 3 - (p - butoxyphenyl) - 2-thiourea; melting point 141-142° after recrystallization from ethanol. The product has the formula:

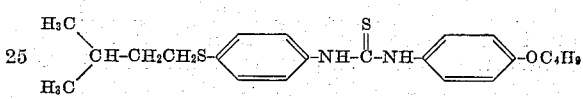

Example 11

7.45 parts by weight of p-aminothiophenol ethyl ether and 8.72 parts by weight of p-phenetyl isothiocyanate in 10 parts by volume of benzene are refluxed for 1 hour. Precipitation starts after five minutes. After the refluxing is finished, the solution is cooled and filtered to yield 1-(p-ethylmercaptophenyl)-3-p-phenetyl-2-thiourea

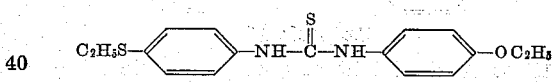

which, on recrystallization from ethanol, melts at 171-172°.

Example 12

6.35 parts by weight of p-aminothiophenol ethyl ether, 2.5 parts by volume of carbon disulfide, 50 parts by volume of ethanol, 0.1 part by weight of potassium ethyl xanthate and 0.1 part by weight of powdered potassium hydroxide are refluxed for 24 hours. After concentration in vacuo and cooling, the product—1,3-bis-(p-ethylmercaptophenyl)-2-thiourea—is removed by filtration and, after recrystallization from ethanol, melts at 173-174°. It corresponds to the formula

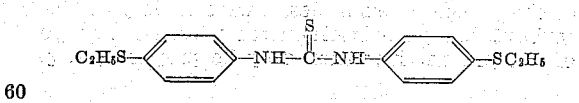

Example 13

9 parts by weight of p-aminothiophenol butyl ether (prepared by alkylating p-acetylaminothiophenol with n-butyl bromide followed by hydrolysis of the acetyl group as hereinbefore described), 8.9 parts by weight of p-phenetyl isothiocyanate and 45 parts by volume of benzene are refluxed for 1.5 hours, precipitation starting after 45 minutes. The solution is cooled and filtered to yield the product, 1-(p-butylmercaptophenyl)-3-(p-phenetyl)-2-thiourea, which

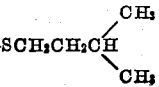

after recrystallization from ethanol melts at 155–156°. It corresponds to the formula

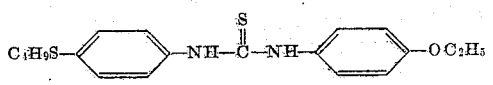

Example 14

3.44 parts by weight of p-aminothiophenol butyl ether, 2.5 parts by volume of carbon disulfide, 50 parts by volume of absolute ethanol, 0.1 part by weight of potassium ethyl xanthate and 0.1 part by weight of powdered potassium hydroxide are refluxed for 18 hours. After concentration in vacuo and cooling, the product—1,3-bis-(p-butylmercaptophenyl)-2-thiourea

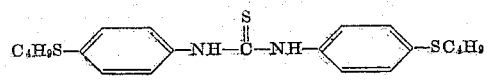

is filtered off, and recrystallized from acetone-water; melting point 155–156°.

Example 15

10.9 parts by weight of p-aminothiophenol n-amyl ether (prepared by alkylating p-acetyl-aminothiophenol with n-amyl bromide followed by hydrolysis of the acetyl group), 10 parts by weight of phenetyl isothiocyanate and 50 parts by volume of benzene are refluxed for 1 hour, precipitation starting after 30 minutes. The solution is cooled and filtered to give the product, 1 - (p - amylmercaptophenyl) - 3 - (p - phenetyl) -2-thiourea, which after recrystallization from acetone melts at 155–156°. It corresponds to the formula

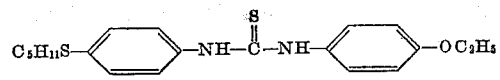

Example 16

10 parts by weight of p-aminothiophenol n-amyl ether, 30 parts by volume of carbon disulfide, 50 parts by volume of absolute ethanol, 0.1 part by weight of potassium ethyl xanthate and 0.1 part by weight of powdered potassium hydroxide are refluxed for 15 hours. After concentration in vacuo and cooling, the formed 1,3 - bis - (p - n - amylmercaptophenyl) - 2-thiourea is filtered and recrystallized from acetone. It melts at 163–164°. It corresponds to the formula

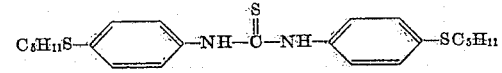

By a suitable choice of reactants, while otherwise proceeding according to the prescriptions of the preceding examples, a wide variety of bis-(substituted phenyl)-thioureas within the scope of the present invention may be prepared, e. g. 1 - (p - propylmercaptophenyl) - 3 - [p - (2-ethoxyethoxy) - phenyl] - 2 - thiourea, 1 - [p-(2 - ethoxyethoxy) - phenyl] - 3 - [p - (β - ethylmercaptoethoxy) - phenyl] - 2 - thiourea, 1-(p - ethylmercaptophenyl) - 3 - [p - (β - ethylmercaptoethoxy)-phenyl]-2-thiourea, etc.

Having thus disclosed the invention, what is claimed is:

1. A (p-substituted phenyl)-thiourea which corresponds to the formula

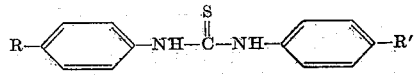

wherein R is a member selected from the group consisting of alkoxy, alkylmercapto, hydroxyalkoxy, alkoxyalkoxy and alkylmercaptoalkoxy, and R' is a member selected from the group consisting of alkylmercapto, hydroxyalkoxy, alkoxyalkoxy and alkylmercaptoalkoxy, the sum of the carbon, oxygen and sulfur atoms in each of R and R' being at least 3 but less than 7, and the aggregate of the carbon, oxygen and sulfur atoms in R and R' being more than 4 but not more than 14.

2. 1,3-bis-[p-(2-ethoxyethoxy)- phenyl]-2-thiourea.

3. 1-(p-phenetyl) - 3-[p - (2 - ethoxyethoxy)-phenyl]-2-thiourea.

4. 1-(p-phenetyl) - 3 - [p - (2-hydroxyethoxy)-phenyl]-2-thiourea.

5. 1-(β - ethylmercapto-p-phenetyl)-3-(p-phenetyl)-2-thiourea.

6. 1-(p-isoamylmercaptophenyl)-3-(p-phenetyl)-2-thiourea.

CHARLES F. HUEBNER.
RENAT H. MIZZONI.
ROBERT P. MULL.
CAESAR R. SCHOLZ.

References Cited in the file of this patent

UNITED STATES PATENTS

| Number | Name | Date |
|---|---|---|
| 2,263,730 | Hentrich et al. | Nov. 25, 1941 |

OTHER REFERENCES

Dienske, "Rec. Trav. Chim," vol. 50 (1931), pp. 407–414.

Lange et al., "J. Am. Chem. Soc.," vol. 48 (1926), pp. 1069–1074.

Dyson et al., "J. Chem. Soc." (London, 1924), vol. 125, pp. 1702–1708.

Braun et al., "Ber deut Chem.," vol. 45 (1912), pp. 2196–2197.

Beilstein, "Handbuch der Organischen Chemie," vol. XIII (1930), p. 546 (4th edition).

Dieke et al., "J. Pharmacol," vol. 90 (1947), page 263.